United States Patent [19]
Eguchi et al.

[11] Patent Number: 6,131,936
[45] Date of Patent: Oct. 17, 2000

[54] LUGGAGE OR SHOPPING CART HAVING A SELF-LOCKING FRONT CASTER WHEEL ASSEMBLY

[75] Inventors: Yasuhiko Eguchi; Heiji Fukutake, both of Neyagawa, Japan

[73] Assignee: Exedy Corporation, Osaka, Japan

[21] Appl. No.: 09/260,844

[22] Filed: Mar. 2, 1999

[30] Foreign Application Priority Data

Apr. 28, 1998 [JP] Japan .................................. 10-118523

[51] Int. Cl.$^7$ .................................................. B60B 33/02
[52] U.S. Cl. ................................... 280/339.4; 280/339.2; 280/339.1; 188/31; 16/35 R; 104/242
[58] Field of Search ................................ 280/5.2, 47.34, 280/62, 79.11, 5.28, 33.994, 33.992, 33.991; 188/31, 5; 16/35 R, 35 D, 47; 301/6.1; 295/8.5; 104/243, 242, 244.1, 245

[56] References Cited

U.S. PATENT DOCUMENTS

| | | | |
|---|---|---|---|
| 3,040,370 | 6/1962 | Ford ........................................ | 16/35 R |
| 3,265,157 | 8/1966 | Rissler ............................... | 280/33.994 |
| 3,305,064 | 2/1967 | Mullis et al. ...................... | 280/33.994 |
| 3,318,432 | 5/1967 | Mullis et al. ...................... | 280/33.994 |
| 3,405,783 | 10/1968 | Clark et al. ........................ | 280/33.994 |
| 4,327,462 | 5/1982 | Eggleston .................................... | 16/47 |
| 4,747,180 | 5/1988 | Screen .................................... | 16/35 R |
| 4,807,328 | 2/1989 | Hezel ......................................... | 16/47 |

FOREIGN PATENT DOCUMENTS

0 373 398 10/1991 European Pat. Off. .
2105547 8/1972 Germany .

*Primary Examiner*—Michael Mar
*Assistant Examiner*—Hau Phan
*Attorney, Agent, or Firm*—Marshall & Melhorn

[57] ABSTRACT

In the front wheel assembly of a luggage or shopping cart, a sensor wheel is supported by a wheel bracket between a pair of caster wheels so as to be rotatable around a common horizontal wheel shaft and moveable downward from a neutral position coaxial with the caster wheels. Thus, even when the cart is tilted sideways, one of the caster wheels always support the load of the cart, and serves as a center of pivotal movement of the front wheel assembly which allows the sensor wheel to be safely lifted out of the slot in the floor. Therefore, the sensor wheel is prevented from being wedged in the slot, and would not be damaged substantially under any circumstances. Additionally, a first locking arrangement allows the cart to be stationary on the conveyor surface, and a second locking arrangement allows the front wheel to remain in the straight ahead position even when the front wheel assembly hangs from an edge of a step of an escalator. These features of the present invention allow the cart to be maneuvered freely on a stationary smooth surface, and to stay stationary in a stable fashion on a moving slotted surface.

5 Claims, 5 Drawing Sheets

LUGGAGE OR SHOPPING CART HAVING A SELF-LOCKING FRONT CASTER WHEEL ASSEMBLY

TECHNICAL FIELD

The present invention relates to a cart pushed by hand such as shopping carts and luggage carts, and in particular to such a cart having a self-locking front caster wheel assembly to allow the cart to be carried on an escalator, a moving sidewalk or other conveying systems.

BACKGROUND OF THE INVENTION

When a luggage cart is pushed onto a conveyor system for transporting pedestrians such as escalators and moving sidewalks, it is desirable to lock a wheel of the cart to keep the cart stationary with respect to the moving staircase or floor. This can be automatically accomplished by providing a sensor wheel immediately next to the front wheel as proposed in DEOS No. 2 105 547. The sensor wheel consists of a disk which is supported by the pivot shaft of the front wheel so as to be moveable to a certain extent in a downward direction. Typically, the sensor wheel is also provided with a first locking arrangement which prevents the rolling of the front wheel when the sensor wheel moves downward from its normal position, and a second locking arrangement which, at the same time, prevents the steering or swiveling movement of the front wheel. Therefore, when the front wheel is pushed onto the moving staircase or floor which is normally provided with a number of longitudinal slots, the sensor wheel drops into one of such longitudinal slots whereby the first locking arrangement locks up the front wheel to keep the cart stationary on the moving staircase or floor. The second locking arrangement at the same time prevents the swiveling movement of the front wheel and keeps the front wheel at the straight ahead position. This is advantageous because it prevents the lateral swaying of the front end of the cart which could occur as the cart moves on from a descending escalator to a normal stationary floor if the front wheel consists of a caster wheel, and hangs over from an edge of the step of the escalator. When the caster wheel hangs over an edge of a step of a descending escalator, the caster wheel tends to swivel into a reverse position under the action of the gravity.

According to the previously proposed sensor wheel arrangements, there was a risk of damaging the sensor wheel when the cart is tilted sideways on a slotted floor. Conventionally, the sensor wheel was attached to one side of the front wheel, and the tilting of the front wheel, in particular toward the side of the sensor wheel, caused the sensor wheel to be wedged in the longitudinal slot of the floor involving such a great stress to the sensor wheel that a damage to the sensor wheel was highly possible.

BRIEF SUMMARY OF THE INVENTION

In view of such problems of the prior art, a primary object of the present invention is to provide a luggage or shopping cart having a self-locking front wheel assembly which can effectively avoid any damage to the sensor wheel under all conditions.

A second object of the present invention is to provide a luggage or shopping cart having a self-locking front wheel assembly which is highly maneuverable on a normal floor, and highly stable on a slotted moving floor.

A third object of the present invention is to provide a luggage or shopping cart having a self-locking front wheel assembly which is both economical to manufacture and highly durable in use.

According to the present invention, these and other objects can be accomplished by providing a cart adapted to be pushed by hand, comprising; a frame; a front wheel assembly centrally attached to a lower front part of the frame; and a pair of rear wheels attached to lower rear parts of the frame; wherein the front wheel assembly includes a support bracket supported in a lower front part of the frame so as to be rotatable around a substantially vertical pivot center line; a pair of caster wheels supported by the bracket so as to be rotatable around a common horizontal wheel shaft; a sensor wheel supported by the bracket between the caster wheels so as to be rotatable around the horizontal wheel shaft and moveable downward from a neutral position coaxial with the caster wheels; a first locking arrangement for blocking rotation of the caster wheels as the sensor wheel drops into a longitudinal slot formed in a floor of a conveying system; and a second locking arrangement for blocking swiveling movement of the bracket around the vertical pivot center as the sensor wheel drops into a longitudinal slot formed in the floor.

Thus, even when the cart is tilted sideways, one of the caster wheels always support the load of the cart, and serves as a center of pivotal movement of the front wheel assembly which allows the sensor wheel to be safely lifted out of the slot in the floor. Therefore, the sensor wheel is prevented from being wedged in the slot, and would not be damaged substantially under any circumstances. Also, the first locking arrangement allows the cart to be stationary on the conveyor surface, and the second locking arrangement allows the front wheel to remain in the straight ahead position even when the front wheel assembly hangs from an edge of a step of an escalator. These features of the present invention allow the cart to be maneuvered freely on a stationary smooth surface, and to stay stationary in a stable fashion on a moving slotted surface.

Preferably, the first locking arrangement comprises a lock pin passed across a stationary central hub of the sensor wheel and received by vertical slots formed in depending pieces extending on either side of the sensor wheel, and radial recesses arranged coaxially at least in one of the caster wheels so as to receive a corresponding end of the lock pin as the sensor wheel drops into a longitudinal slot in the floor. Thus, the lock pin can be secured firmly by the depending pieces which can be made of relatively heavy plate members forming a part of the wheel bracket, and a reliable locking action and a high level of durability can be achieved.

Preferably, the second locking arrangement comprises a lever pivotally supported at a middle part thereof by the bracket via a laterally extending pivot pin; a vertical link connected between an end of the lever and an end of the lock pin; a tongue piece extending upwardly from another end of the lever; and a notch formed in a member fixedly secured to the frame so as to receive the tongue piece when the sensor wheel drops into a longitudinal slot in the floor to thereby tilt the lever via the vertical link. Thus, the locking of the swiveling movement of the front wheel assembly can be accomplished by using a simple and compact linkage arrangement which is both economical and reliable.

In particular, the stationary central hub may comprise a molded plastic disk having an elongated slot in a central part thereof for passing the wheel shaft therethrough while the sensor wheel further comprises an annular disk fitted over an outer periphery of the central hub via a radial bearing. Thus, the sensor wheel can be made highly durable without either complicating the stucture or increasing the cost. It is desirable to urge the sensor wheel downward to ensure a reliable activation of the sensor wheel. It can be conveniently accomplished if the stationary central hub further comprises a short tube fitted onto a middle part of the wheel shaft, and a compression coil spring interposed between a lower bottom end of the elongated slot and the short tube.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
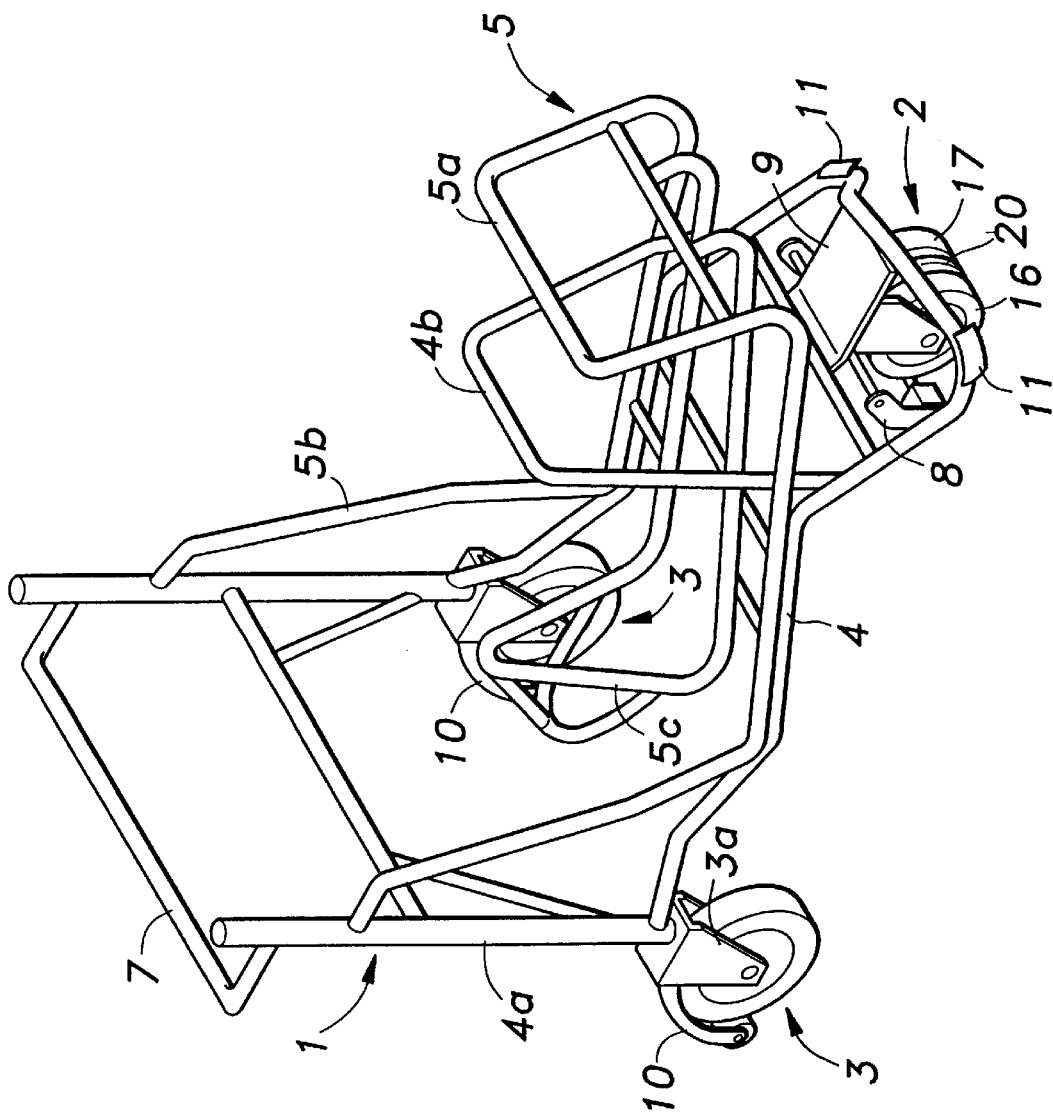
FIG. 1 is a perspective view of a luggage cart embodying the present invention.

FIG. 1 shows a luggage cart 1 for carrying luggage in airport facilities embodying the present invention. This luggage cart 1 comprises a frame 1 made by combining hollow pipe members, a front wheel assembly 2 comprising a pair of caster wheels attached to a bottom surface of a central front part of the frame 1, and a pair of rear wheels 3 consisting of single-wheel casters attached to the lower surface of either side of the frame 1.

The frame 1 comprises a rectangular base 4 which is formed by bending a single pipe member in the shape of rectangular letter-U with the open end facing rearward, and has a longitudinally middle part inclining downward toward the rear. The front end of the base 4 inclines downward toward the front, and carries a mounting plate 9 for the front wheel assembly 2. The rear ends of the base 4 are joined to lower ends of a pair of upright columns 4a. A lateral handle bar 7 extends across the upper ends of these upright columns 4a.

A gate-shaped middle luggage guard 4b extend upright from either side of a middle part of the base 4. A luggage support 5 is attached to the base 4, and this luggage support 5 includes a gate-shaped front luggage guard 5a extending upright at some distance ahead of the middle luggage guard 4b, and a somewhat narrower triangular rear luggage guard 5c extending upright at some distance behind the middle luggage guard 4b. The rear ends of the pipe members forming the luggage support 5 are bent upward, and joined to upper parts of the upright columns 4a. The triangular rear luggage guard 5c is provided with a guide projection which is adapted to be fitted into a central gap formed in the corresponding front part of the luggage support of another similar cart for the convenience of storing a number of such carts one nested in another.

A stopper arm 8 is pivotally attached to a rear end of the mounting plate 9 to support the front end of the cart on a descending escalator. The pivotal movement of the stopper arm 8 is suitably damped so that the free end of the stopper arm 8 may support the front end of the cart while the front wheel is left hanging from the cart over an edge of the step on which the stopper arm 8 rests. The rear wheels 3 are attached to the lower ends of the upright columns 4a via brackets 3a, and similar stopper arms 10 are provided in association with the corresponding rear wheels 3. These stopper arms 10 support the rear end of the cart on an ascending escalator. The front end of the base 4 is provided with a pair of bumpers 11 for supporting the front end of the cart on a descending escalator.

Figure 2:
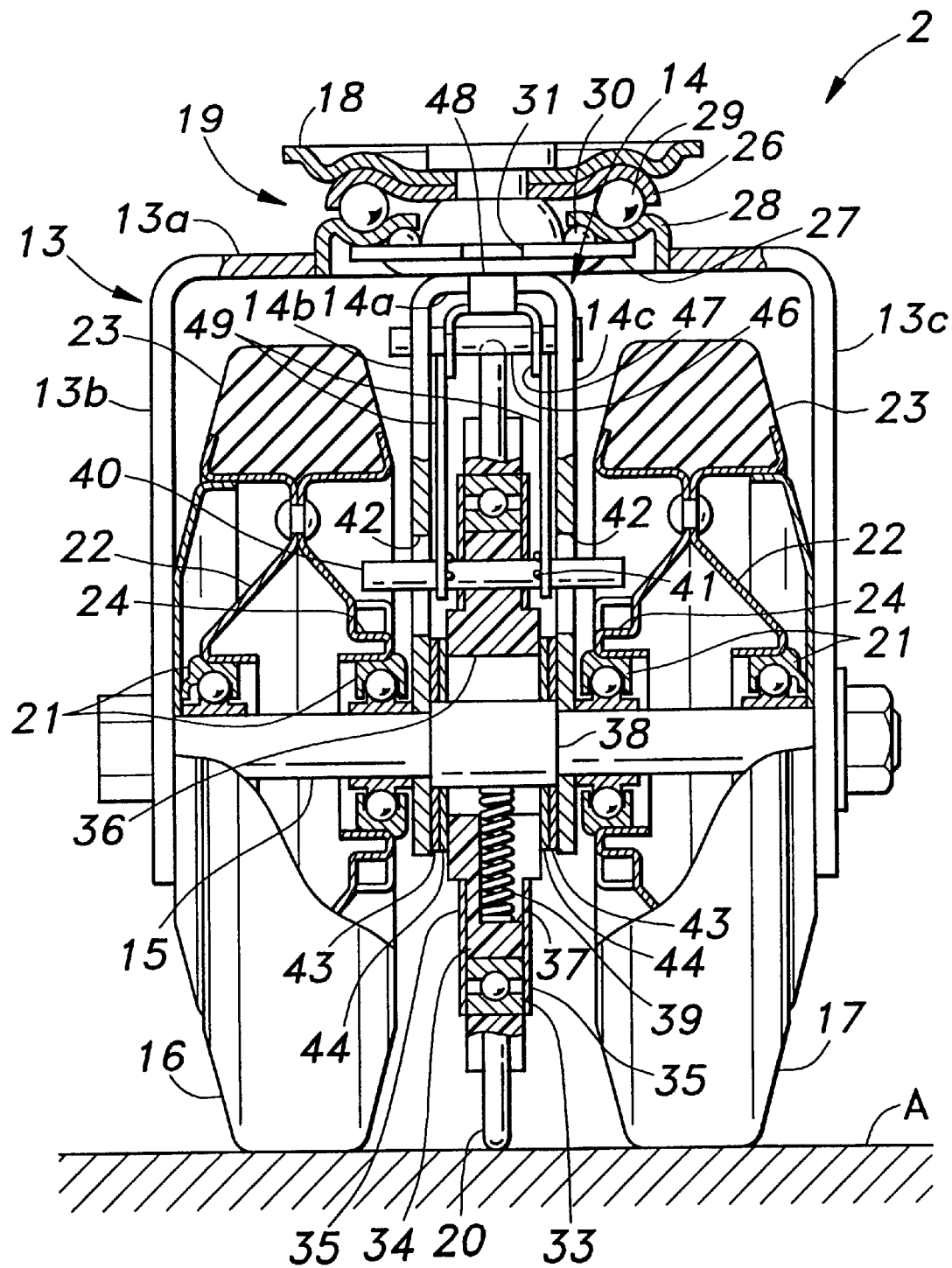
FIG. 2 is a sectional front view of the front wheel assembly of the luggage cart.

Referring to FIG. 2, the front wheel assembly 2 includes a pair of caster wheels 16 and 17 rotatably supported on a horizontal wheel shaft 15, inner and outer brackets 14 and 13 supporting the wheel shaft 15, and a thrust bearing 19 interposed between the upper plate 13a of the outer bracket 13 and a mounting base 18 for attaching the front wheel assembly 2 to the mounting plate 9. The inner and outer brackets 14 and 13 are integrally attached to each other so as to define a relatively narrow central slot receiving a sensor wheel 20 which is described hereinafter, and a pair of relatively wide slots defined on either side of the central slot to receive the respective wheels 16 and 17.

Figure 3:
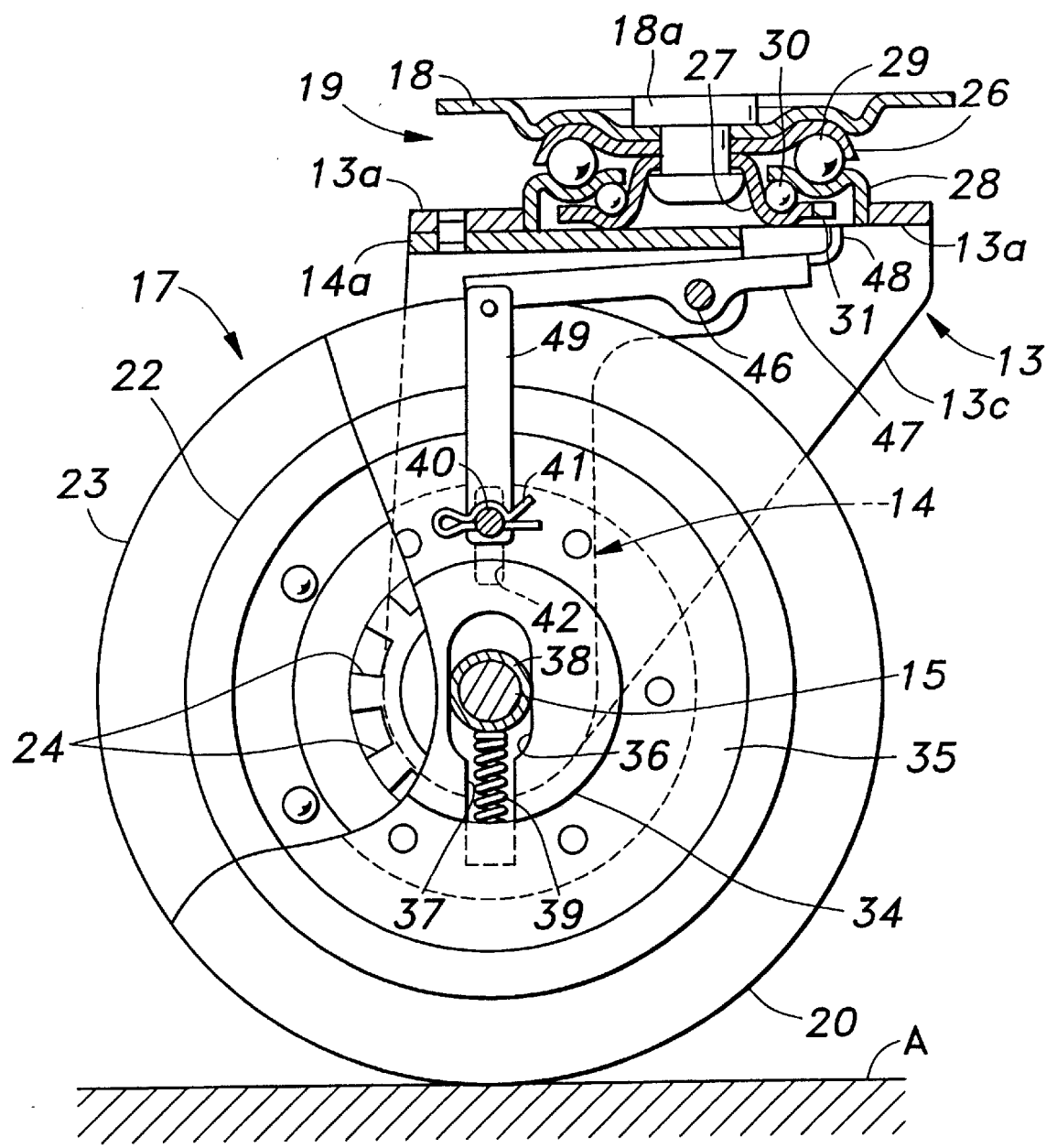
FIG. 3 is a partly broken away sectional side view of the front wheel assembly.

Each of the wheels 16 and 17 comprises a disk 22 rotatably supported on the wheel shaft 15 via a pair of radial bearings 21, and a rubber tire 23 fitted around the peripheral rim of the disk 22. The disk 22 is formed by joining a pair of stamp formed halves, and a series of recesses 24 are concentrically formed in a part of each inner wheel disk half surrounding the radial bearing 21 as best illustrated in FIG. 3.

The thrust bearing 19 includes an upper retaining disk 26 and a lower retaining disk 27 which are jointly attached to the mounting base 18 by crimping a central pin 18a, and an intermediate annular retaining disk 28 having an inner periphery received in a gap defined between the outer peripheries of the upper and lower retaining disks 26 and 27. A first set of steel balls 29 are concentrically arranged around the central pin 18a between the upper retaining disk 26 and the intermediate annular retaining disk 28, and a second set of steel balls 30 are concentrically arranged around the central pin 18a between the intermediate annular retaining disk 28 and the lower retaining disk 27. A notch 31 is formed in a front end of the outer periphery of the lower retaining disk 27.

The sensor wheel 20 is adapted to be received in the longitudinal slots formed in the moving floor of pedestrian conveying systems. This sensor wheel 20 comprises a central hub 34 having a keyhole shaped vertical slot 36 formed in a central part thereof, and has an inner race of a ball bearing 33 fitted on an outer circumferential surface thereof. A pair of annular metallic disks 35 are attached to either side of the central hub 34 for reinforcement. The central hub 34 is made of nylon or other durable plastic material. The wheel shaft 15 fitted with a short tube 38 thereon is passed through the vertical slot 36 of the central hub 34 so as to accommodate a downward movement of the central hub 34 from its neutral position coaxial with the other wheels 16 and 17, and a compression coil spring 39 interposed between a bottom end of an extension 37 of the vertical slot 36 and the outer surface of the tube 38 normally urges the central hub 34 downward.

A lock pin 40 is laterally passed through an upper part of the central hub 34, and the two outer ends of the lock pin 40 are passed through a vertically elongated slot 42 formed in the side plates 24b and 24c of the inner bracket 14, respectively. A pair of clips 41 restricts the axial movement of the lock pin 40 with respect to the central hub 34. Thus, the vertically elongated slots 42 in the side plates 24b and 24c prevent the rotation of the central hub 34 while permitting the vertical movement thereof. A planar washer 43 and a wave washer 44 are interposed between each side surface of the central hub 34 and the opposing surface of the corresponding side plate 24b or 24c so that the central hub 34 may be able to move vertically without tilting toward either side.

A longitudinally extending lever 47 is pivotably supported by a pivot pin 46 passed across the side plates 24b and 24c at an upper part of the inner bracket 14. The lever 47 has an inverted U-shaped cross section, and a tongue piece 48 is bent upward at a forward end (right end in FIG. 3) of the lever 47. To the rear end (left end in FIG. 3) of this lever 47 is pivotally attached the upper ends of a pair vertical links 49 which extend on either side of the sensor wheel 20 to transmit the vertical movement of the central hub 34 to the rear end of the lever 47. The lower ends of the vertical links 49 are pivotally connected to the lock pin 40.

When the luggage cart described above is moving on a flat floor surface, the sensor wheel 20 which is urged downward by the compression coil spring 39 is supported by the floor surface, and rolls over the floor surface coaxially with respect to the wheels 16 and 17 as illustrated in FIGS. 2 and 3. The stopper arms 8 and 10 are both spaced from the floor surface, and do not affect the movement of the luggage cart.

Figure 4:
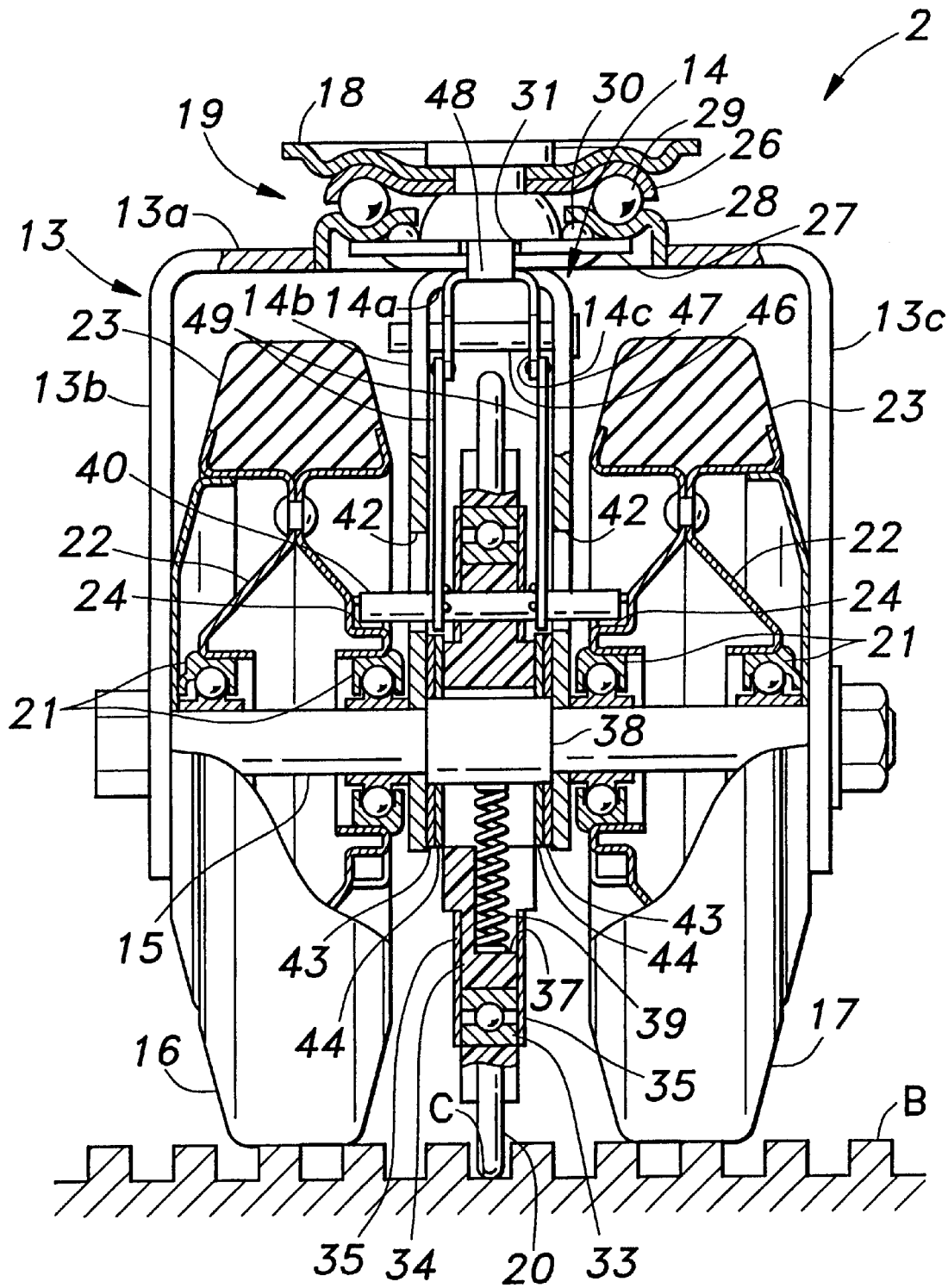
FIG. 4 is a view similar to FIG. 2 showing the front wheel assembly of the luggage cart in its locked state.
Figure 5:
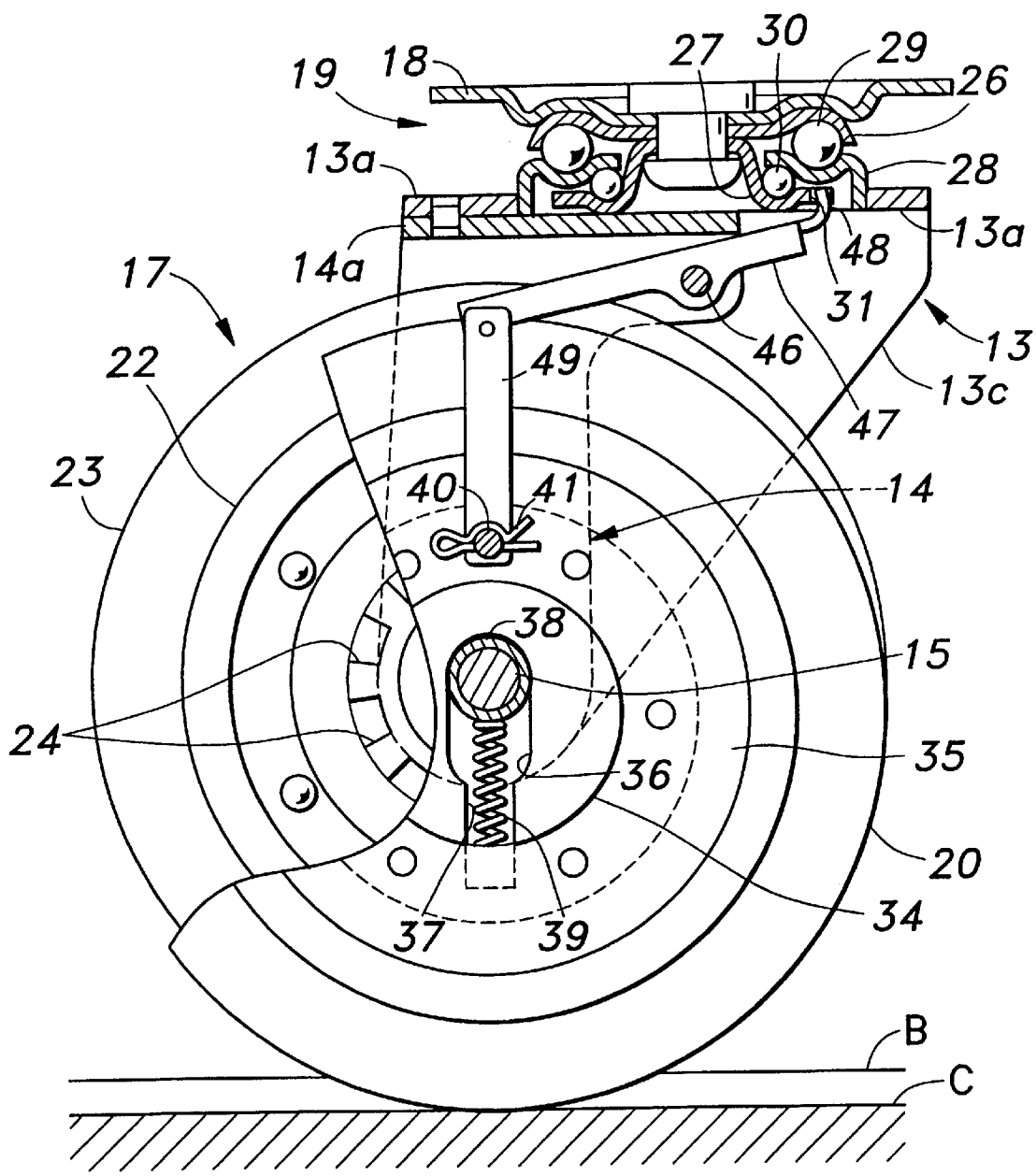
FIG. 5 is a view similar to FIG. 3 showing the front wheel assembly of the luggage cart in its locked state.

Once the luggage cart moves onto a slotted floor surface of a conveyor system, such as escalators and moving sidewalks, the sensor wheel 20 drops into one of the slots C in the slotted floor surface B as illustrated in FIGS. 4 and 5. This causes the central hub 34 to descend, and the two ends of the lock pin 40 drop into the recesses 24 formed in the corresponding wheels 16 and 17, thereby preventing the rotation of the wheels 16 and 17. The lock pin 40 is firmly secured by the side plates 14b and 14c of the inner bracket 14 having a high rigidity so that the wheels 16 and 17 can be firmly kept stationary. At the same time, the links 49 also move downward, and the resulting movement of the lever 47 pushes the tongue piece 48 into the notch 31 in the lower retaining disk 27 of the thrust bearing 19. This prevents the rotation of the brackets 13 and 14 around the pivot pin 18a, and the swiveling motion of the front wheel assembly 2 is prohibited.

When the front wheel assembly 2 moves out of the slotted floor surface, and moves onto a smooth floor surface, the sensor wheel 20 is pushed upward by the floor surface against the spring force of the compression coil spring 39. This causes the lock pin 40 to be raised and move out of the recesses 24 of the wheels 16 and 17, and the wheels 16 and 17 are allowed to roll freely. This also causes the tongue piece 48 of the lever 47 to move out of the notch 31, and the front wheel assembly 2 is allowed to swivel freely.

The front wheel assembly 2 is locked with respect to both the rolling motion and the swiveling motion as it moves onto a slotted floor surface of a conveyor system, but the rear wheels 3 can freely roll at all times. Therefore, at the starting end of a conveyor system, the locked up front wheel assembly 2 is pulled onto the conveyor system while the rear wheels 3 simply follow the motion of the luggage cart. Conversely, at the terminal end of a conveyor system, as soon as the front wheel assembly 2 moves onto a smooth stationary floor surface, the luggage cart can be pushed forward and out of the conveyor system by the person standing behind the luggage cart while the rear wheels 3 are still on the slotted floor surface.

When the luggage cart is being carried on an ascending escalator, not only the front wheel assembly 2 is firmly locked up but also the stopper arms 10 rest upon the step of the escalator on which the rear wheels 3 are resting so that the luggage cart can be kept stationary on the escalator in a stable fashion. When the luggage cart is being carried on an descending escalator, either the bumpers 11 abut the step of the escalator on which the front wheel assembly 2 is resting or the front stopper arm 8 is engaged by the corresponding step while the front wheel assembly 2 hangs over this step. In either case, the luggage cart can be kept stationary on the escalator in a stable fashion. In particular, because the front wheel assembly hanging over the corresponding step is engaged in a straight ahead position by the tongue piece 48 fitted in the notch 31, it can smoothly move onto the flat stationary surface as it moves out of the descending escalator without involving any swaying movement of the front end of the luggage cart. The bumpers 11 additionally provide the function of supporting the load of the luggage and the cart itself, and thereby removing a part of the load applied to the front wheel assembly.

Thus, according to the above described embodiment, when the cart is tilted sideways in either direction on a slotted floor surface, the sensor wheel is simply lifted out of the slot, and excessive stress is prevented from being applied to the outer periphery of the sensor wheel. Also, the lifting movement of the sensor wheel locks the front wheel assembly against both the rolling movement and the swiveling movement so that the cart is prevented from being brought into any unstable state. Thus, the present invention improves the stability and the maneuverability of a cart such as luggage carts and shopping carts.

Although the present invention has been described in terms of a preferred embodiment thereof, it is obvious to a person skilled in the art that various alterations and modifications are possible without departing from the scope of the present invention which is set forth in the appended claims.

What is claimed is:

1. A cart adapted to be pushed by hand, comprising:
    a frame, a front wheel assembly centrally attached to a lower front part of said frame, and a pair of rear wheels attached to lower rear parts of said frame, wherein said front wheel assembly includes a support bracket supported in a lower front part of said frame so as to be pivotable about a single substantially vertical pivot center line, a pair of caster wheels supported by said support bracket so as to be rotatable around a common horizontal wheel shaft, a sensor wheel supported by said support bracket between said caster wheels so as to be rotatable around said horizontal wheel shaft and moveable vertically relative to the wheel shaft between a neutral position in which the sensor wheel is coaxial with said caster wheels, when the wheel assembly is traversing a planar surface, and a lowered position in which a bottom surface of the sensor wheel is positioned below bottom surfaces of the pair of caster wheels, a first locking arrangement for blocking rotation of said pair of caster wheels as said sensor wheel drops into a longitudinal slot formed in a floor of a conveying system and into said lowered position, and a second locking arrangement for blocking swiveling movement of said support bracket around said vertical pivot center as said sensor wheel drops into the longitudinal slot formed in the floor and into said lowered position.

2. A cart according to claim 1, wherein said first locking arrangement comprises a lock pin passes across a stationary central hub of said sensor wheel and received by vertical slots formed in depending pieces extending on either said of said sensor wheel, and radial recesses arranged coaxially at least in one of said cater wheels so as to receive a corresponding end of said lock pin as said sensor wheel drops into the longitudinal slot in the floor.

3. A cart according to claim 2, wherein said second locking arrangement comprises a lever pivotally supported at a middle part thereof by said bracket via a laterally extending pivot pin, a vertical link connected between an end of said lever and an end of said locking pin, a tongue piece extending upwardly from another end of said lever, and a notch formed in a member fixedly secured to said frame so as to receive said tongue piece when said sensor wheel drops into the longitudinal slot in the floor to thereby tilt the lever via said vertical link.

4. A cart according to claim 2, wherein said stationary central hub comprises a molded plastic disk having an elongated slot in a central part thereof for passing said wheel shaft therethrough, and said sensor wheel further comprises an annular disk fitted over an outer periphery of said central hub via a radial bearing.

5. A cart according to claim 4, wherein said stationary central hub further comprises a short tube fitted onto a middle part of said wheel shaft, and a compression coil spring interposed between a lower bottom end of said elongated slot and said short tube.

* * * * *